United States Patent
Golgolab et al.

(10) Patent No.: US 7,505,231 B1
(45) Date of Patent: Mar. 17, 2009

(54) ACTUATOR INCLUDING A COIL AND A WRAP-AROUND SUPPORT SUPPORTING A TANG

(75) Inventors: Arman V. Golgolab, Los Altos, CA (US); Alex Y. Tsay, Fremont, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 455 days.

(21) Appl. No.: 11/297,894

(22) Filed: Dec. 9, 2005

(51) Int. Cl.
*G11B 21/04* (2006.01)
(52) U.S. Cl. .................................. 360/265.7
(58) Field of Classification Search .............. 360/264.7, 360/265.9, 265, 265.7
See application file for complete search history.

(56) References Cited

U.S. PATENT DOCUMENTS

| | | | |
|---|---|---|---|
| 5,369,538 A | 11/1994 | Moe et al. | |
| 5,734,528 A | 3/1998 | Jabbari et al. | |
| 5,870,253 A * | 2/1999 | Ogawa et al. | 360/245.9 |
| 5,982,587 A | 11/1999 | Alagheband et al. | |
| 6,535,358 B1 | 3/2003 | Hauert et al. | |
| 6,574,073 B1 | 6/2003 | Hauert et al. | |
| 6,678,121 B2 * | 1/2004 | Lee et al. | 362/265 |
| 7,088,556 B1 * | 8/2006 | Fu et al. | 360/264.7 |
| 7,277,256 B2 * | 10/2007 | Jeong | 360/264.7 |
| 7,327,537 B1 * | 2/2008 | Oveyssi | 360/264.7 |
| 2002/0034053 A1 * | 3/2002 | Okunaga et al. | 360/264.7 |
| 2003/0218827 A1 * | 11/2003 | Teo et al. | 360/97.01 |
| 2004/0105190 A1 * | 6/2004 | Kim et al. | 360/264.7 |
| 2005/0162782 A1 * | 7/2005 | Tsuda et al. | 360/264.7 |

* cited by examiner

*Primary Examiner*—Tianjie Chen
(74) *Attorney, Agent, or Firm*—Barcelo & Harrison LLP

(57) ABSTRACT

There is provided an actuator for a disk drive. The actuator includes an actuator body defining an axis of rotation. The actuator further includes a coil. The actuator further includes a wrap-around support extending from the actuator body radially beyond the coil with respect to the axis of rotation without encircling the coil. The actuator further includes a tang supported by the wrap-around support. The coil is positioned radially between the tang and the axis of rotation. The actuator body, the wrap-around support, and the tang are all a single components comprising a metal material having material continuity rather than an assembly of subcomponents.

5 Claims, 3 Drawing Sheets

ACTUATOR INCLUDING A COIL AND A WRAP-AROUND SUPPORT SUPPORTING A TANG

FIELD OF THE INVENTION

The present invention relates generally to disk drives, and in particular actuator including a coil and a wrap-around support supporting a tang.

BACKGROUND

The typical hard disk drive includes a head disk assembly (HDA) and a printed circuit board assembly (PCBA) attached to a disk drive base of the HDA. The head disk assembly includes at least one disk (such as a magnetic disk, magneto-optical disk, or optical disk), a spindle motor for rotating the disk, and a head stack assembly (HSA). The printed circuit board assembly includes a servo control system in the form of a disk controller for generating servo control signals. The head stack assembly includes at least one head, typically several, for reading and writing data from and to the disk. In an optical disk drive, the head will typically include a mirror and objective lens for reflecting and focusing a laser beam on to a surface of the disk. The head stack assembly is controllably positioned in response to the generated servo control signals from the disk controller. In so doing, the attached heads are moved relative to tracks disposed upon the disk.

The spindle motor typically includes a rotatable spindle motor hub, a magnet attached to the spindle motor hub, and a stator. Various coils of the stator are selectively energized to form an electromagnetic field that pulls/pushes on the magnet, thereby imparting a rotational motion onto the spindle motor hub. Rotation of the spindle motor hub results in rotation of the attached disks.

The head stack assembly includes an actuator assembly, at least one head gimbal assembly, and a flex circuit assembly. A conventional "rotary" or "swing-type" actuator assembly typically includes an actuator having an actuator body. The actuator body has a pivot bearing cartridge to facilitate rotational movement of the actuator assembly. One or more actuator arms extend from the actuator body. The configuration of an actuator body and actuator arms is sometimes referred to as an "E-block." Each actuator arm supports at least one head gimbal assembly that includes a head. An actuator coil is supported by the actuator body opposite the actuator arms. The actuator coil is configured to interact with one or more magnets, typically a pair, to form a voice coil motor. The printed circuit board assembly selectively controls current passing through the actuator coil that results in a torque being applied to the actuator.

A latching mechanism is provided to facilitate latching of the actuator in a parked position when the heads are not being used to interact with the tracks on the disk. In the parked position, the actuator is positioned with the heads either at an outer diameter (OD) or inner diameter (ID) of the disk. A crash stop coupled to the disk drive base is provided to limit rotation of the actuator in a given direction. The crash stop is configured to contact a portion of the actuator when the actuator is rotated in a given rotational direction. Another crash stop may be provided to limit actuator rotation in an opposite rotational direction. The latching mechanism may additionally function as one of the crash stops.

Some contemporary actuators use a coil that is coupled to an actuator body through the use of a plastic overmold. For example, a machined metal E-block and an actuator coil may be overmolded with plastic that encircles a coil. Such a design is subject to thermal dissipation problems at the coil and the surrounding overmold plastic. Since the coil and overmold materials typically have grossly dissimilar coefficients of thermal expansion, the temperature swings exacerbated by thermal dissipation problems can cause higher stresses which, in turn, may lead to thermally induced mechanical instability. For example, such thermally induced mechanical instability may include an undesirable stick-slip phenomenon known as "coil popping." In contrast, so-called "bonded coil" designs do not use a plastic overmold and therefore are not subject to the same degree of thermal gradient. However, traditional bonded coil designs may have other disadvantages in certain applications, such as manufacturability, bond strength, and cost.

Accordingly, it is contemplated that there is need in the art for an improved bonded coil actuator configuration.

SUMMARY

According to an aspect of the present invention, there is provided an actuator for a disk drive. The actuator includes an actuator body defining an axis of rotation. The actuator further includes a coil. The actuator further includes a wrap-around support extending from the actuator body radially beyond the coil with respect to the axis of rotation without encircling the coil. The actuator further includes a tang supported by the wrap-around support. The coil is positioned radially between the tang and the axis of rotation. The actuator body, the wrap-around support, and the tang are all a single component comprising a metal material having material continuity rather than an assembly of subcomponents.

According to another aspect of the present invention, there is provided a disk drive that includes the actuator as described above.

DESCRIPTION OF THE PREFERRED EMBODIMENTS

Figure 1:
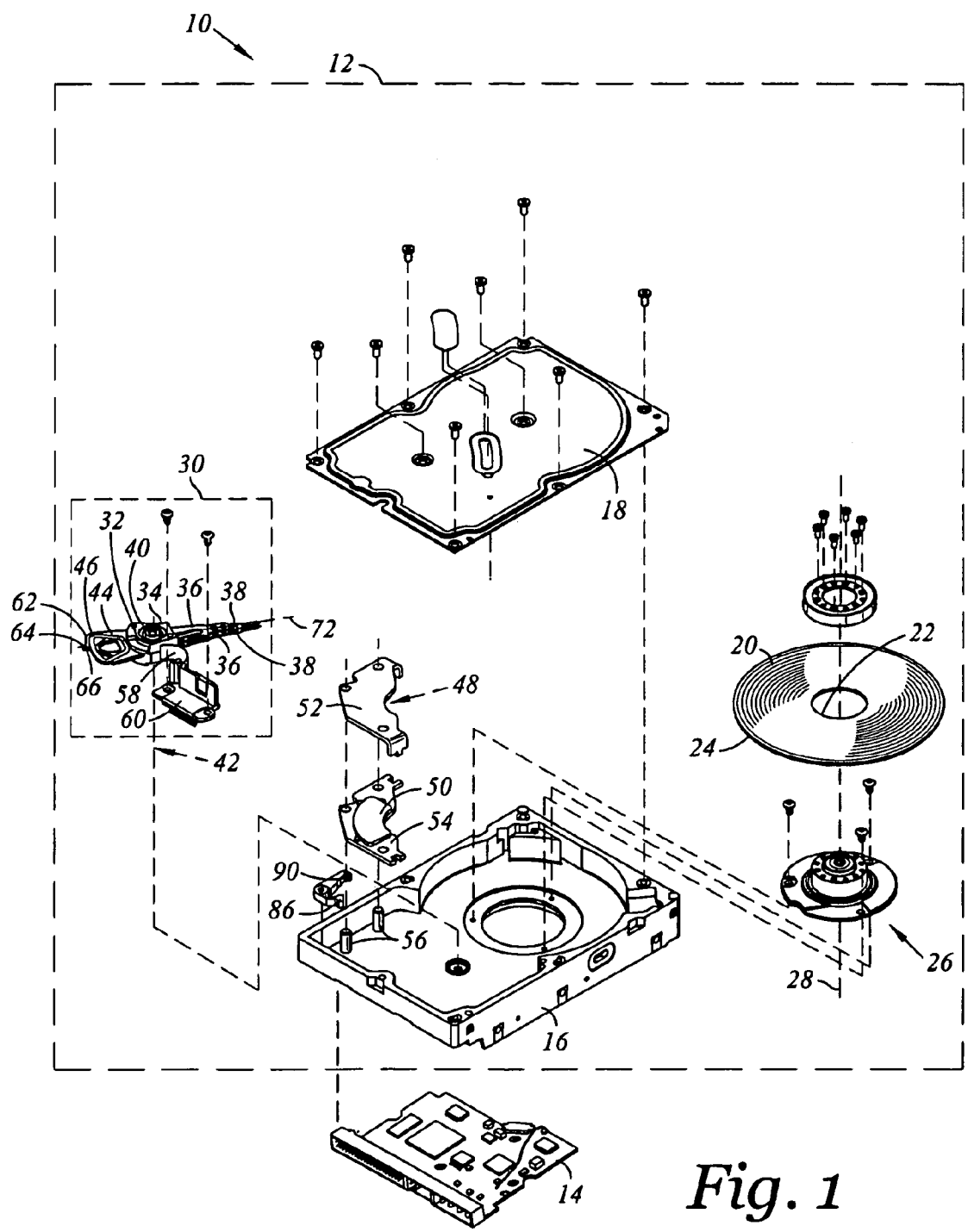
FIG. 1 is an exploded top perspective view of a disk drive including an actuator according to an embodiment of the present invention.

Referring now to FIG. 1, there is depicted an exploded perspective view of a disk drive 10 according to an embodiment of the present invention. The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. The disk drive base 16 and the cover 18 collectively house a disk 20. A single disk or additional disks may be utilized. The disk 20 includes an inner diameter (ID) 22 and an outer diameter (OD) 24. The disk further includes a plurality of tracks for storing data. The disk 20 may be of a magnetic recording type of storage device, however, other arrangements such as optical recording may be utilized. The head disk assembly 12 further includes a spindle motor 26 for rotating the disk 20 about a disk rotation axis 28. The head disk assembly 12 further includes a head stack assembly 30 rotatably attached to the disk drive base 16 in operable communication with the disk 20. The head stack assembly 30 includes an actuator 32.

The actuator 32 includes an actuator body 34 and actuator arms 36 that extend from the actuator body 34. Distally attached to the actuator arms 36 are suspension assemblies 38. The suspension assemblies 38 respectively support heads. The suspension assemblies 38 with the heads are referred to as head gimbal assemblies. It is contemplated that the number of actuator arms and suspension assemblies may vary depending upon the number of disks and disk surfaces utilized.

Each head typically includes a transducer for writing and reading data. Each transducer typically includes a writer and a read element. In magnetic recording applications, the transducer's writer may be of a longitudinal or perpendicular design, and the read element of the transducer may be inductive or magnetoresistive. In optical and magneto-optical recording applications, the head may also include an objective lens and an active or passive mechanism for controlling the separation of the objective lens from a disk surface of the disk 20. The disk 20 includes opposing disk surfaces. In magnetic recording applications the disk surface typically includes one or more magnetic layers. Data may be recorded along data annular regions on a single disk surface or both.

The head stack assembly 30 may be pivoted such that each head is disposed adjacent to the various data annular regions from adjacent to the outer diameter 24 to the inner diameter 22 of the disk 20. In the embodiment shown, the actuator body 34 includes a bore, and the actuator 32 further includes a pivot bearing cartridge 40 engaged within the bore for facilitating the actuator body 34 to rotate between limited positions about an axis of rotation 42.

The actuator 32 further includes a coil support element 44 that extends from one side of the actuator body 34 opposite the actuator arms 36. The coil support element 44 is configured to support a coil 46. The coil support element 44 includes a wrap-around support 62 as will be discussed in further detail below.

First and second of magnets 48, 50 are supported by first and second magnet supports 52, 54 which are attached to the disk drive base 16 (the first magnet 48 is denoted in dashed lining and it is understood that it is disposed at an underside of the first magnet support 52). Posts 56 may be provided to couple the first and second magnet supports 52, 54 to the disk drive base 16. The coil 46 interacts with the first and second magnets 48, 50 to form a voice coil motor for controllably rotating the actuator 32. The head stack assembly 30 further includes a flex cable assembly 58 and a cable connector 60. The cable connector 58 is attached to the disk drive base 16 and is disposed in electrical communication with the printed circuit board 14. The flex cable assembly 58 supplies current to the coil 46 and carries signals between the heads and the printed circuit board assembly 14.

Figure 2:
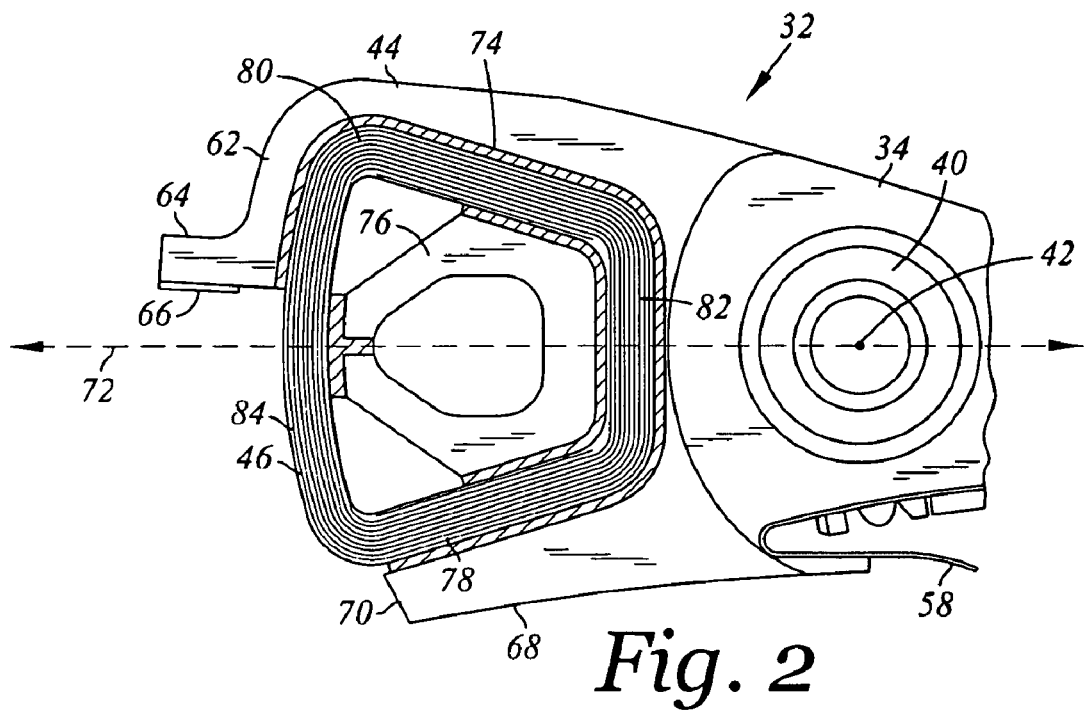
FIG. 2 is an enlarged top plan view of a portion of the actuator of FIG. 1.
Figure 3:
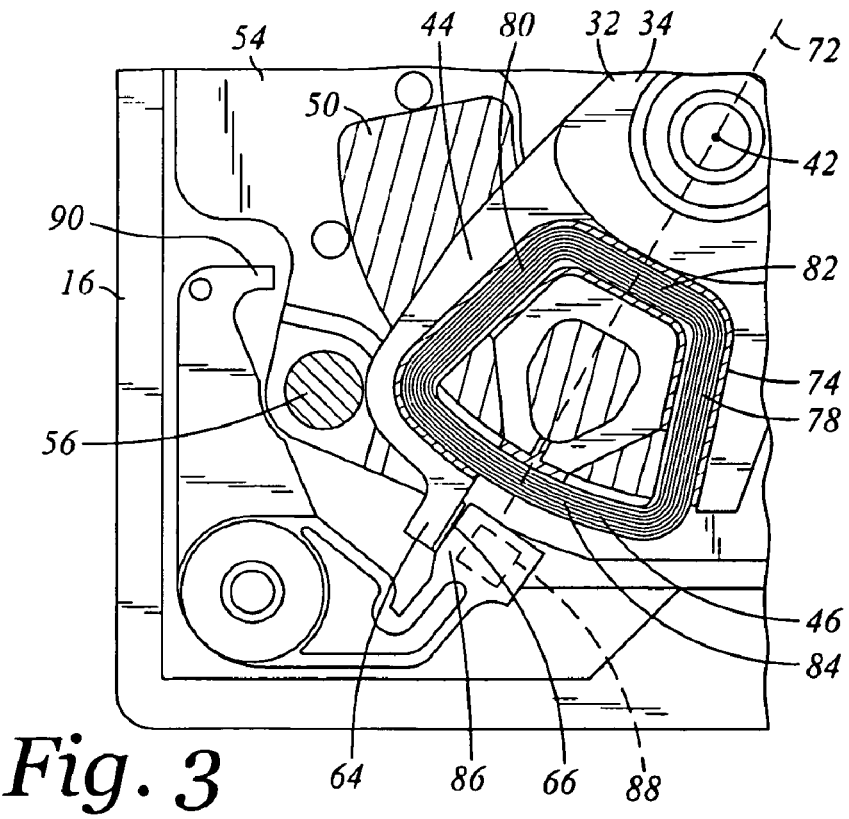
FIG. 3 is an enlarged top plan view of a portion of the disk drive of FIG. 1 including portions of the actuator in a parked position, first and second crash stops, a second magnet support and a second magnet as assembled without a first magnet support and first magnet.
Figure 4:
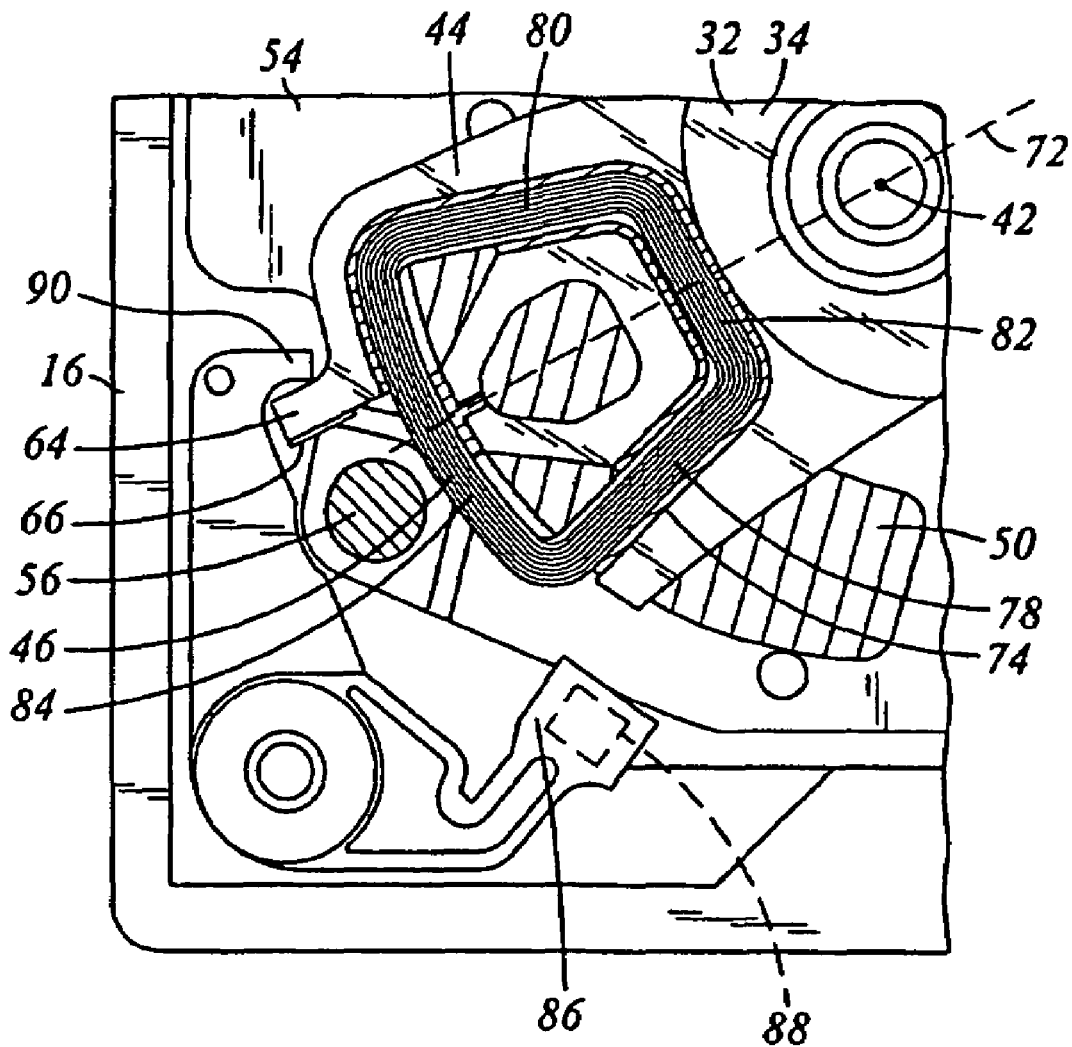
FIG. 4 is a view similar to FIG. 3, however, with the actuator in stop position.

Referring additionally to FIG. 2, there is depicted an enlarged top plan view of a portion of the actuator 32 of FIG. 1. FIG. 3 depicts an enlarged top plan view of a portion of the disk drive 10 of FIG. 1 with the actuator in a parked position. FIG. 3 illustrates portions of the actuator 32, first and second crash stops 86, 90, the second magnet support 54 and the second magnet 50 as assembled without a first magnet support 52 and first magnet 48. FIG. 4 depicts a view similar to FIG. 3, however, with the actuator 32 in stop position.

In the embodiment of FIG. 2, the actuator 32 includes the actuator body 34 defining the axis of rotation 42. The actuator 34 further includes the coil 46. The actuator 32 further includes the wrap-around support 62 extending from the actuator body 34 radially beyond the coil 46 with respect to the axis of rotation 42 without encircling the coil 46. The actuator 32 further includes a tang 64 supported by the wrap-around support 62. The coil 46 is positioned radially between the tang 64 and the axis of rotation 42. The actuator body 34, the wrap-around support 62, and the tang 64 are all a single component comprising a metal material having material continuity rather than an assembly of subcomponents.

As mentioned above, the actuator body 34, the wrap-around support 62, and the tang 64 are all a single component comprising a metal material having material continuity rather than an assembly of subcomponents. In this regard, the actuator body 34, the wrap-around support 62, and the tang 64 are collectively an integrally formed part. The actuator body 34, the wrap-around support 62, and the tang 64 may comprise aluminum. In addition, the actuator arms 36 may further be included in the single component with the actuator body 34. Further, the coil support element 44 may include a side support 68. The side support 68 extends from the actuator body 34 and terminates at a distal end 70. The coil 46 may be centered between the wrap-around support 62 and the side support 68. The side support 68 may further be included in the single component with the actuator body 34.

It is contemplated that the single metal component that includes the actuator body 34, the wrap-around support 62, the tang 64, the actuator arms 36, and the side support 68 may be formed by a machining process. The wrap-around support 62 terminates at the tang 64. As mentioned above, the wrap-around support 62 extends from the actuator body 34 radially beyond the coil 46 with respect to the axis of rotation 42 without encircling the coil 46. In this regard, the wrap-around support 62 in conjunction with the actuator body 34 does not completely encircle or otherwise completely loop around the coil 46 to create a closed magnetic circuit about or alongside the coil 46. In the embodiment shown, the wrap-around support 62 does not contact the distal end 70 of the side support 68. It is contemplated that metal material that may completely encircle the coil 46, in the presence of magnetic fields associated with the actuator, could result in the formation of undesirable eddy currents. As such, the wrap-around support 62 distally extends to the tang 64. In addition, the coil 46 has the opportunity to dissipate more heat by convection than a design that completely encircles the coil 46 with material. Moreover, the wrap-around support 62 and the actuator body 34 may facilitate improved heat dissipation from the coil 42 by conduction. This is because the wrap-around support 62 and actuator body 34 are formed of metal material which conducts heat better than certain other materials such as overmold plastic.

In the embodiment shown, the coil 46 may be provided with a bobbin 76. The bobbin 76 may be used to facilitate the coiling of the coil 46 about the bobbin 76. The coil 46 may be attached to the actuator body 34, such as with an epoxy adhesive 74. In this regard, the coil 46 may be attached to the coil support element 44 with the epoxy adhesive 74 disposed between the coil 46 and the wrap-around support 62 and between the coil 46 and the side support 68 as shown. Such a configuration facilitates a "bonded coil" design.

The coil 46 may include first and second radial segments 78, 80 and first and second transition segments 82, 84. The first and second radial segments 78, 80 overlap the first and second magnets 48, 50 throughout a full range of motion of the actuator 32. Such overlapping refers to being aligned when overlaid in a plane orthogonal to the axis of rotation 42 such as viewed in FIGS. 3 and 4. A magnetic flux path extends in a loop through the first and second magnet supports 52, 54 and between the first and second magnets 48, 50. With this configuration, current passing through the coil 46 results in a torque being applied to the actuator 32. A change in direction of the current through the coil 46 results in a change in direction of the torque applied to the actuator 32. It is contemplated that other magnet, coil and magnet support configurations may be utilized, such as a multiple coil arrangement and a vertical coil arrangement.

As mentioned above, the actuator 32 further includes the wrap-around support 62 extending from the actuator body 34 radially beyond the coil 46 with respect to the axis of rotation 42, and the coil 46 is positioned radially between the tang 64 and the axis of rotation 42. Such a configuration requires that the wrap-around support 62 "wraps-around" the coil 46. This allows the tang 64 to be positioned towards a longitudinal axis 72 of the actuator arms 36 rather than merely off to the side of the coil 46. The actuator arms 36 define the longitudinal axis 72 that extends orthogonal to and through the axis of rotation 42. The tang 64 may be angularly positioned within 15 degrees of the longitudinal axis 72 with respect to the axis of rotation 42 such as roughly shown. As will be discussed below, the disk drive 10 may further include a first crash stop 86 and a second crash stop 90. It is contemplated that the positioning of the tang 64 with the coil 46 between the tang 64 and the axis of rotation 42 may facilitate a configuration of the first and second stops 86, 90 to be a single component having material continuity rather than an assembly of subcomponents. The first and second crash stops 86, 90 may be a single piece of plastic for example.

As shown in FIG. 3, the actuator 32 may be rotated to a first position. In the first position, the tang 64 is disposed adjacent the first crash stop 86. In this embodiment, the positioning of the first crash stop 86 prevents the actuator 32 from further rotating in a counter-clockwise direction. During operation the disk drive 10 may be exposed in external forces, such as a shock event. The first crash stop 86 thus contains the movement of the heads of the actuator 32. Further in this first position, the actuator 32 is positioned with the heads towards the inner diameter 22 of the disk 20. The first position may also be a parked position with the actuator 32 configured to come to rest in this position when not performing read or write operations. In this regard, the tang 64 may include a latching element 66. The latching element 66 may comprise a ferromagnetic metal material, such as steel. The first crash stop 86 may include a latch 88 (as shown in dashed line in FIGS. 3 and 4). The latch 88 may be a ferromagnetic latch and may be a magnet. As such, the latching element 66 may be magnetically attracted to the latch 88 for maintaining the actuator 32 in the first position.

As shown in FIG. 4, the actuator 32 may be rotated to a second or stop position. In the second position, the tang 64 is disposed adjacent the first crash stop 86. In this embodiment, the positioning of the second crash stop 90 prevents the actuator 32 from further rotating in a clockwise direction. Further in this second position, the actuator 32 is positioned with the heads towards the outer diameter 24 of the disk 20. It is contemplated that because wrap-around support 62 is provided with the tang 64 particularly positioned with the coil 46 radially between the tang 64 and the axis of rotation 42 the first and second crash stops 86, 90 may be positioned relatively closer to the longitudinal axis 72. This would be in comparison to a design where a crash stop contacts a coil support element off to a side of a coil. As such, the wrap-around support 62 facilitates the first crash top 86 being relatively away from a perimeter of the disk drive base 16 as may be required to facilitate certain space constrains.

We claim:

1. A disk drive comprising:
   an actuator comprising:
      an actuator body defining an axis of rotation;
      a coil;
      a wrap-around support extending from the actuator body radially beyond the coil with respect to the axis of rotation without encircling the coil; and
      a tang supported by the wrap-around support, the coil positioned radially between the tang and the axis of rotation;
      wherein the actuator body, the wrap-around support, and the tang are all a single component comprising a metal material having material continuity rather than an assembly of subcomponents;
   the disk drive further comprising a first crash stop, the actuator being rotatable between first and second positions, the tang being disposed at the first crash stop with the actuator in the first position;
   wherein the first crash stop includes a latch, the tang including a latching element, the latching element being engaged with the latch with the actuator in the first position.

2. The disk drive of claim 1 wherein the latch is a ferromagnetic latch.

3. The disk drive of claim 1 wherein the latching element comprises a ferromagnetic metal material.

4. The disk drive of claim 1 wherein the actuator body, the wrap-around support, and the tang comprise aluminum.

5. The disk drive of claim 1 wherein the actuator comprises an actuator arm defining a longitudinal axis extending orthogonal to and through the axis of rotation, the tang being angularly positioned within 15 degrees of the longitudinal axis with respect to the axis of rotation.

* * * * *